United States Patent
Lownertz

(10) Patent No.: US 7,686,964 B2
(45) Date of Patent: Mar. 30, 2010

(54) METHOD AND DEVICE FOR WASHING OF LIME MUD

(75) Inventor: Patrik Lownertz, Taby (SE)

(73) Assignee: Metso Fiber Karlstad AB, Karlstad (SE)

( * ) Notice: Subject to any disclaimer, the term of this patent is extended or adjusted under 35 U.S.C. 154(b) by 832 days.

(21) Appl. No.: 10/599,595

(22) PCT Filed: Apr. 14, 2005

(86) PCT No.: PCT/SE2005/000537

§ 371 (c)(1),
(2), (4) Date: Oct. 3, 2006

(87) PCT Pub. No.: WO2005/100681

PCT Pub. Date: Oct. 27, 2005

(65) Prior Publication Data

US 2007/0221345 A1    Sep. 27, 2007

(30) Foreign Application Priority Data

Apr. 16, 2004 (SE) .................................... 0401000

(51) Int. Cl.
*B01D 33/15* (2006.01)
*B01D 33/82* (2006.01)
*D21C 11/00* (2006.01)

(52) U.S. Cl. ............... 210/772; 210/780; 210/791; 210/808; 210/331; 210/332; 210/416.1; 162/14; 162/16

(58) Field of Classification Search ............ None
See application file for complete search history.

(56) References Cited

U.S. PATENT DOCUMENTS

| 1,689,534 A | * | 10/1928 | Richter ............... 162/30.11 |
| 3,029,948 A | * | 4/1962 | Mckay ............... 210/771 |
| 3,245,536 A | * | 4/1966 | Mckay ............... 210/784 |
| 3,258,391 A | * | 6/1966 | Cornell et al. ......... 162/30.11 |
| 3,269,941 A | * | 8/1966 | Le Compte et al. ......... 210/749 |
| 3,409,545 A | * | 11/1968 | Albertson ............... 210/624 |
| 3,531,370 A | * | 9/1970 | Gould ............... 162/33 |
| 3,833,464 A | * | 9/1974 | Rolfe ............... 162/29 |
| 4,168,234 A | * | 9/1979 | Hutto, Jr. ............... 210/193 |
| 4,207,141 A | * | 6/1980 | Seymour ............... 162/49 |
| 4,695,381 A | * | 9/1987 | Ragnegard ............... 210/403 |
| 4,929,355 A | * | 5/1990 | Ragnegard et al. ......... 210/784 |

(Continued)

FOREIGN PATENT DOCUMENTS

WO    WO 9502442 A1 *   1/1995
WO    WO 2006056649 A1 *   6/2006

*Primary Examiner*—Robert James Popovics
(74) *Attorney, Agent, or Firm*—Rolf Fasth; Fasth Law Offices

(57) ABSTRACT

The method and an arrangement are for dewatering and washing lime slurry before the dewatered lime mud is passed to a lime mud kiln. The lime slurry is dewatered in a pressurized lime mud filter of disc or drum type. The pressurized lime mud filter is pressurized through a compressor drawing on its suction side (s) gas phase from the filtrate tank and pressurizing on the pressurized side (p) of the compressor the pressure vessel on the lime mud side of the filter. A certain pre-determined amount of gas phase in the gas circulation system is vented and an equivalent pre-determined amount of fresh air is added to the recycled gas phase with the aim of maintaining the partial pressure of oxygen gas above a certain minimum level.

17 Claims, 2 Drawing Sheets

U.S. PATENT DOCUMENTS

| | | | |
|---|---|---|---|
| 5,145,556 A * | 9/1992 | Westerberg et al. | 162/29 |
| 5,151,176 A * | 9/1992 | Strid et al. | 210/178 |
| 5,227,064 A * | 7/1993 | Strid | 210/327 |
| 5,290,454 A * | 3/1994 | Dorica et al. | 210/710 |
| 5,705,031 A * | 1/1998 | Angevine | 162/30.11 |
| 5,788,813 A * | 8/1998 | Engdahl et al. | 162/29 |
| 5,851,392 A * | 12/1998 | Brady, Jr. | 210/396 |
| 5,897,788 A * | 4/1999 | Ketolainen et al. | 210/784 |
| 5,900,158 A * | 5/1999 | Ruokolainen et al. | 210/772 |
| 5,968,372 A * | 10/1999 | Martensson et al. | 210/741 |
| 6,063,294 A * | 5/2000 | Martensson et al. | 210/739 |
| 6,074,522 A * | 6/2000 | Seymour | 162/49 |
| 6,258,282 B1 * | 7/2001 | Strid et al. | 210/780 |
| 6,419,835 B1 * | 7/2002 | Virtanen et al. | 210/739 |
| 6,793,809 B2 * | 9/2004 | Ingelman et al. | 210/143 |
| 6,833,077 B2 * | 12/2004 | Flanagan | 210/772 |
| 7,005,067 B2 * | 2/2006 | Flanagan | 210/248 |
| 2002/0166821 A1 * | 11/2002 | Flanagan | 210/784 |
| 2002/0166822 A1 * | 11/2002 | Flanagan | 210/784 |
| 2004/0045913 A1 * | 3/2004 | Flanagan | 210/780 |
| 2004/0069721 A1 * | 4/2004 | Ingelman et al. | 210/767 |
| 2005/0103727 A1 * | 5/2005 | Flanagan | 210/772 |
| 2007/0221345 A1 * | 9/2007 | Lownertz | 162/16 |
| 2007/0251891 A1 * | 11/2007 | Lownertz et al. | 210/791 |
| 2008/0164222 A1 * | 7/2008 | Engdahl et al. | 210/772 |

* cited by examiner

METHOD AND DEVICE FOR WASHING OF LIME MUD

PRIOR APPLICATION

This application is a U.S. national phase application based on International Application No. PCT/SE2005/000537, filed 14 Apr. 2005, claiming priority from Swedish Patent Application No. 0401000-5, filed 16 Apr. 2004.

TECHNICAL AREA

The present invention relates to a method and device for washing of lime mud.

THE PRIOR ART

During the conventional production of liquor in a soda recovery boiler, sodium carbonate ($Na_2CO_3$) and sodium sulphide ($Na_2S$) flow out from the boiler in the form of a melt into a melt dissolver. The sodium carbonate and sodium sulphide are mixed in the melt dissolver with water to form a solution. This solution is normally known as "green liquor". Solid contaminants are washed from the green liquor on output from the melt dissolver in a green liquor clarifier, which clarifier separates the solid contaminants from the green liquor by sedimentation. It is also possible that cleaning of the green liquor take place through the use of suitable filter equipment. The green liquor is sent after cleaning to a lime shaker in which the green liquor is mixed with burnt lime, which consists principally of calcium oxide (CaO). The green liquor will now react with the burnt lime.

Initially, the liquor will undergo a slaking reaction in which the water in the green liquor reacts with the calcium oxide (CaO) and forms calcium hydroxide, slaked lime (CaOH). The volume of the solid lime particles increases in association with this reaction such that they break apart and form very small particles that form a slurry with the green liquor.

A second reaction will subsequently follow in which the slaked lime reacts with the carbonate present in the green liquor to form calcium carbonate ($CaCO_3$) and hydroxide ions ($OH^-$). At this stage the green liquor is said to have been "causticized". Particles of calcium carbonate are separated from the liquor in the next stage by filtration or by clarification. The cleaned liquor at this stage is known as "white liquor". The white liquor can now be used in a cooking process during the production of chemical paper pulp. The second waste product from the causticization process is known as "lime slurry". The lime slurry can be washed in water in one or several steps before it is dewatered to form lime mud and fed into a lime kiln. Calcination of the lime mud takes place in the lime kiln, which converts the content of calcium carbonate ($CaCO_3$) to burned lime, which principally consists of calcium oxide (CaO).

This burned lime can subsequently be used as slaker in a lime slaker as described above.

Three purposes are achieved in association with the final wash and dewatering of the lime mud before the lime mud kiln: 1) The levels of sodium and sulphide in the lime mud are reduced. 2) A lime mud that is sufficiently dry is obtained such that the reburning will be profitable. 3) Oxidation of the remaining sulphide content of the lime mud. This is carried out in order to prevent unnecessary release of foul-smelling hydrogen sulphide (HS) from the lime mud kiln.

The final wash/dewatering before the lime mud kiln is most often carried out in a conventional process in a vacuum drum filter or in a vacuum disc filter. The mode of action of these types of filter is as follows:

The lime mud is initially fed to a filter trough. The drum or the discs in the vacuum filter are covered with a filter membrane, normally made of polypropylene, and connected to a vacuum system that creates a suction pressure across the filter membrane. The drum or the discs rotate continuously in such a manner that parts of the drum or disc surface will temporarily be wetted by the lime mud in the trough.

The suction pressure will lead to parts of the lime mud forming a cake on the surface of the filter membrane. The drum continues to rotate such that new lime mud cake is formed and such that the cake is penetrated by air. It is usual that the filter has also a spray wash that sprays the cake. The penetration of the cake by air acts as a dewatering of the cake but is also exposes the remaining sulphide for the necessary oxidation. A scraper is arranged on the downwards passing side of the drum or discs with the purpose of scraping away the surface layer of lime mud from the filter membrane. The rotation of the drum or discs means that the process of building up a new cake of lime mud will be repeated. It has been customary to connect the lime mud side directly to the atmosphere/ambient air, due to the requirement that the sulphide be oxidised.

Some of the problems/disadvantages of the currently used vacuum filters are:
 Considerable electrical power is consumed in creating the vacuum pressure across the filter.
 The filtering capacity of the lime mud is limited, since the pressure difference across the filter is limited to atmospheric pressure.
 There is a limited possibility of increasing the capacity of the filter by any other means than extension (such as a larger drum, for example).
 Large temperature losses to the surroundings occur, which means that the oxidation cannot take place at a higher temperature, something that is advantageous for the oxidation reaction.

Pressurised disc filters are often used during the production of white liquor in association with the white liquor separation, as white liquor filters to separate the lime mud from the white liquor. One of the purposes of the pressurised white liquor filter is to minimise the oxidation of released sulphide, since sulphide is an active ingredient in the cooking process. The gas is for this reason circulated within the filter such that air, which risks oxidising the lime mud, is not introduced into it.

Temperature losses should also be avoided during the separation of white liquor, since temperature losses must be compensated by the addition of supplementary heat to the digester plant. The white liquor filters at this position are for this reason designed as pressure filters, with gas that is to be recirculated in a closed circulation by the use of a compressor. A pressure filter has the further advantage over a vacuum filter that the pressure difference across the filter is not limited to atmospheric pressure.

The use of pressurised filters at the position of the final washing and dewatering stage before the lime mud kiln where vacuum filters are currently used is not normally carried out for the reasons that the oxidation of the lime mud is one of the principal aims, which requires an excess of oxygen, and that dry output from the pressurised filter is a problem. The final wash and dewatering filter of the lime mud is for this reason maintained with its lime mud side open to the surrounding atmosphere, whereby a lower pressure is established on the filtrate side of the filter. In contrast to white liquor separation, it is desired that the lime mud be oxidised as much as possible at this position, something that is not possible using current pressurised filters that operate in closed gas systems, in which insufficient oxygen is available for oxidizing the lime mud.

THE AIM OF THE INVENTION

The principal aim of the present invention is to achieve an invention that fully or partially alleviates current problems/disadvantages with vacuum drum filters and vacuum disc filters in association with the final wash and dewatering of the lime mud prior to the lime mud kiln, and:

- to achieve a better oxidation of remaining sulphide in the lime mud through a lime mud wash with a higher partial pressure of oxygen gas.
- to achieve a better oxidation of remaining sulphide in the lime mud through a lime mud wash with a significantly higher temperature.
- to increase the capacity of the filtration while maintaining or reducing the area required (the building space of the filter), whereby the increase in capacity can be obtained in existing buildings without the need for extending premises.
- to minimise the use of pressurised air. The consumption of electricity in those cases in which compressors are used is also reduced by minimising the use of pressurised air.

BRIEF DESCRIPTION OF THE INVENTION

The present invention concerns the use of a pressurised filter at the position of the final washing and dewatering stage prior to the lime mud kiln.

The invention is based upon the surprising insight that it is not necessary at a raised temperature and with pressurised filters to connect the lime mud side of the filter to the atmosphere in order to obtain the required amount of oxygen for the oxidation of the lime mud. It has proved to be the case that exchanging 5-20% of the recirculated gas for fresh air in the pressurised system, essentially complete oxidation of the lime mud is obtained, while at the same time an elevated temperature can be established, something that is advantageous for the oxidation of the lime mud.

The present invention concerns the use of a pressurised filter at the position of the final washing and dewatering stage prior to the lime mud kiln. The principal problem that the invention addresses is that of achieving oxidation of the remaining sulphide in a more efficient manner than that obtained using the current vacuum filters at this position.

The partial pressure of oxygen in the filter must be maintained at a sufficiently high level, in order to obtain this oxidation. The oxidation of sulphide consumes oxygen, and oxygen gas must for this reason be supplied to the gas circulation system. This is not a problem in the normal vacuum drum filters or vacuum disc filters, since the gas systems are fully open to the surrounding air, which is sucked in through the lime mud cake.

A controlled part of the gas phase in the circulation system is vented, according to the invention, while at the same time an equivalent amount or fresh air is added.

The following advantages over the prior art are achieved with the invention:

Higher partial pressure of the oxygen gas, which gives better oxidation.
Higher temperature, which gives better oxidation.
Increased filtering capacity, while maintaining or reducing the area required.

DETAILED DESCRIPTION OF THE INVENTION

The concept "pressurised filter" will be mentioned in the following detailed description of the invention. The term "pressurised filter" is here used to denote both pressurised disc filters and pressurised drum filters.

The concepts "lime slurry" and "dewatered lime mud" will also be mentioned. The term "lime slurry" is here used to denote a slurry of lime mud that has not yet been dewatered in the filter and where the lime slurry contains lime mud+filtrate. The term "dewatered lime mud" is here used to denote lime mud that has been dewatered from filtrate by the filter and that contains only "pure" lime mud, intended for direct or indirect transport to a lime mud kiln.

Finally, the concepts "lime mud side" and "filtrate side" will be mentioned. The term "lime mud side" is here used to denote those sides of the disc or drum on which lime mud fastens during the filtration. The term "filtrate side" is here used to denote the side of the filters on which filtrate is present.

Figure 1:
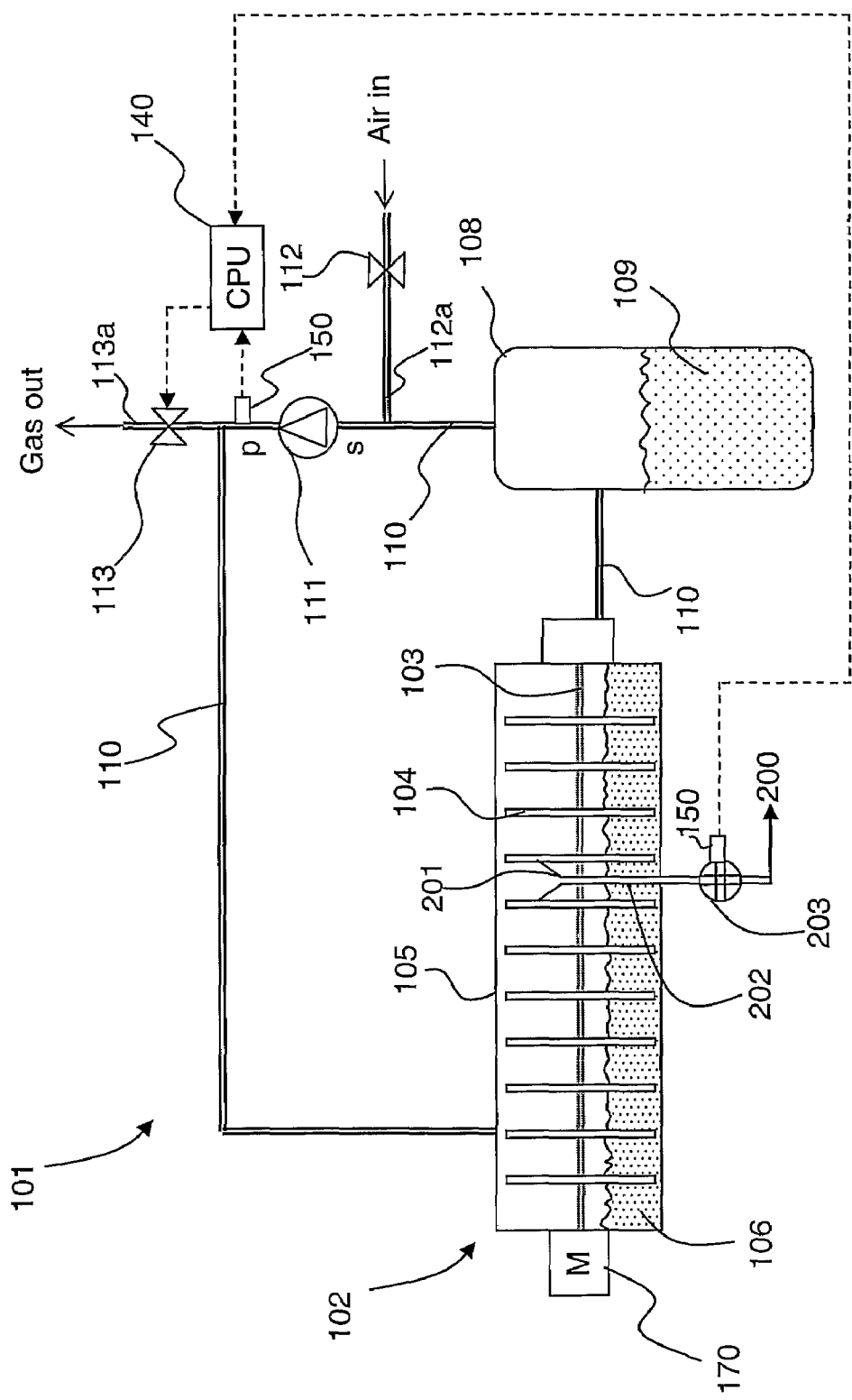
FIG. 1 shows schematically a first preferred embodiment of the invention.

FIG. 1 shows a mainly closed gas circulation system 101 for the dewatering and washing of lime slurry 106 before the dewatered lime mud 130 is sent to a lime mud kiln 200, either directly or through an intermediate storage (not shown). At this position, i.e. at the final lime mud washing before the lime mud is sent to the lime mud kiln, the amount of white liquor residue in the lime slurry is less than 10%, preferably less than 5%, of the white liquor that is formed during the preceding causticization.

A pressurised filter 102 is arranged within this gas circulation system 101, here in the form of a disc filter. The temperature in the pressurised filter 102, including the temperature of the recirculating gas phase, is at least 75° C., preferably 75-95° C. The pressurised disc filter 102 comprises a hollow shaft 103 on which a number of filter-covered discs 104 have been fixed arranged. The hollow shaft 103 is connected at one end to a rotating motor 170. The discs 104 and the hollow shaft 103 are surrounded by a pressurised vessel 105 in the pressurised filter 102. The filter-covered discs 104 are submerged partially in the lime slurry 106, where the filtrate 109 is removed via the discs 104 through the hollow shaft 103 and onwards through a recirculation line 110 to a filtrate tank 108 on the filtrate side of the filter. A fluid level of the filtrate 109 from the pressurised filter 102 is established in the filtrate tank 108. A recirculation line 110 passes from the gas phase on the filtrate side of the filter onwards to the lime mud side of the filter for the recirculating gas phase. A compressor 111 is arranged between the filtrate tank 108 and the lime mud side of the filter. The compressor 111 draws from its suction side (s) gas phase from the filtrate tank 108 and it pressurises from its pressurised side (p) the pressure vessel 105 on the lime mud side of the filter. The "filtrate side" of this filter is constituted by the space in the discs 104, the hollow shaft 103, and the filtrate tank 108.

This means that the gas phase is recirculated in the closed gas circulation system 101.

In order to achieve oxidation of the sulphide in the lime mud, a pre-determined controlled amount of the recirculating pressurised gas phase is vented from the gas circulation system through a de-airing device 113a on the pressurised side (p) of the compressor 111 and an equivalent amount of fresh air is added to the recirculating gas phase through an air-supply device 112a on the suction side (s) of the compressor 111, with the aim of maintaining the partial pressure of oxygen gas above a pre-determined minimum level. It is appropriate that the de-airing and the air supply are controlled by a control unit 140, through the control unit 140 sending signals to a regulator valve 113 arranged at the de-airing device 113a and to a regulator valve arranged at the air-supply device 112a with information about whether the regulator valves 112,113 are to be opened or closed. The control unit 140 receives input signals from sensors 150, that are placed arranged in order to detect at least one process parameter such as, for example, the level of oxygen gas, the rate of revolution of the filter or the amount of lime mud output.

It is preferable that the control of the air exchange is regulated such that the minimal partial pressure of oxygen gas of 0.15 bar is established.

A sufficient amount of oxygen is in this way supplied such that the oxidation of the sulphide in the lime mud can take place. The amount of recirculated gas phase that is exchanged in the gas circulation system lies within the interval 5%-20%, preferably less than 10% of the total amount of gas phase in the gas circulation system, and it is regulated by the setting of the regulator valves 112, 113.

The regulator valve for de-airing 113 is, in its most simple embodiment, closed down to a nominal value, while the regulator valve for air supply 112 is fully open. It may be sufficient that the regulator valve 113 can be regulated, for various processes.

The lime mud that attaches to the outer surface (the lime mud side) of the discs is subsequently scraped off by scrapers 201 in order to subsequently fall down into collection chutes 202 and onwards out from the filter through suitable sluice devices 203 that maintain the pressure in the filter. This lime mud is then dry-fed to a lime mud kiln 200 either directly or via intermediate storage (not shown).

Only one scraper arrangement 201 between two discs is shown in the drawing, but similar scraper arrangements 201 are, naturally, located against all filter surfaces of the discs 104.

Figure 2:
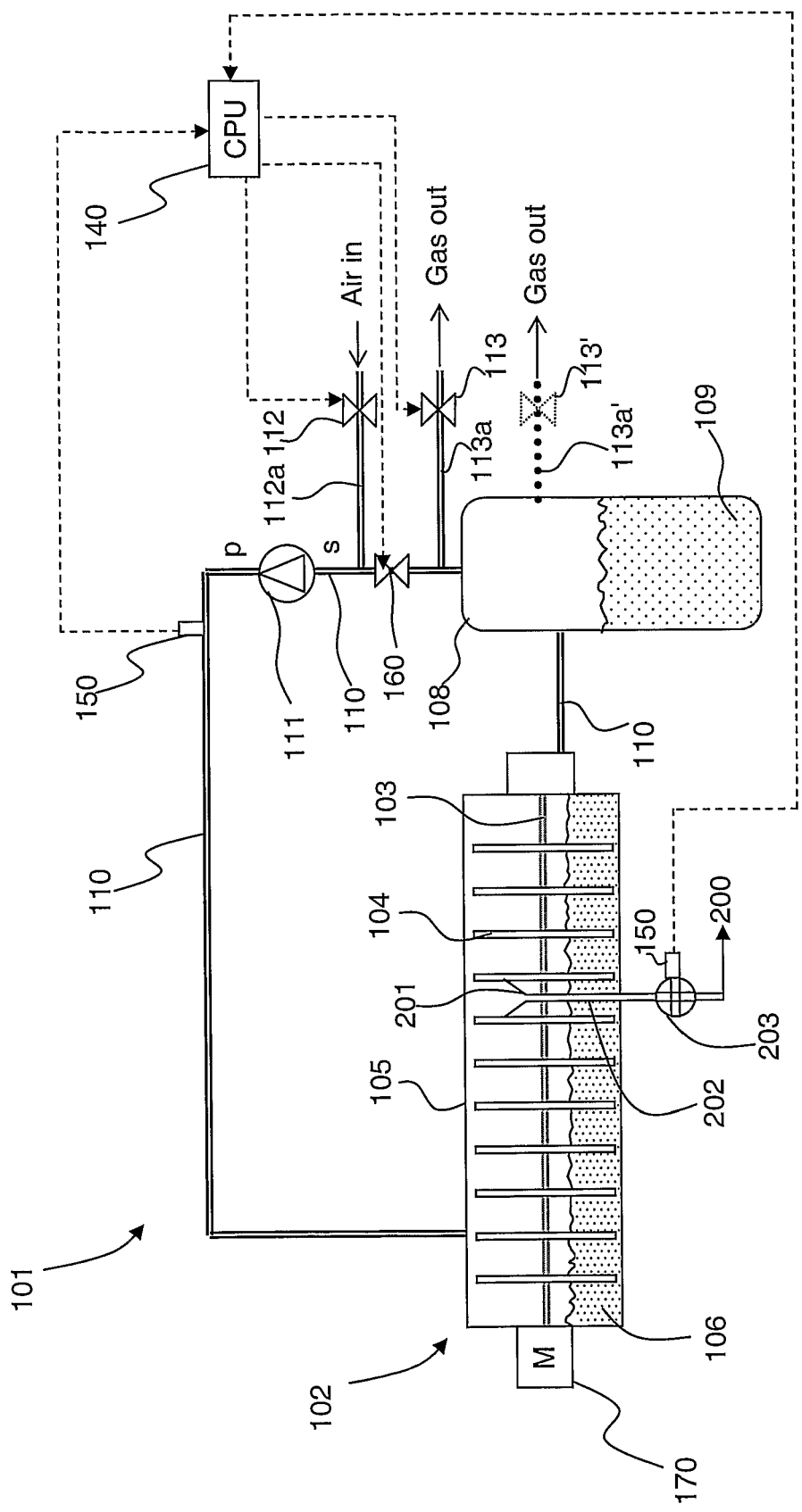
FIG. 2 shows schematically an embodiment of the invention that is an alternative to the first embodiment.

FIG. 2 shows two alternative embodiments of the first embodiment described above. The gas phase is here vented at a position before the position at which fresh air is added through de-airing devices 113a, on the suction side (s) of the compressor 111. Regulator valves 112, 113 equivalent to those in FIG. 1 are, naturally, used, and preferably used with a control unit 140. One advantage here is that unused oxygen intended for the oxidation of the mud is not vented out, only "used" air. The de-airing of the equivalent controlled amount of used air is carried out either through a regulator valve 113 or through a regulator valve 113' at a first distance from the compressor 111 on the suction side (s) of the compressor. The addition of fresh air is carried out through an air-supply device 112a of fresh air connected to the suction side (s) of the compressor at a second distance from the compressor 111. The first distance is greater than the second distance.

Furthermore, a regulator valve 160 is arranged between the connections for the de-airing and the air supply if these connections are located close to each other.

The regulator valve for de-airing 113/160 is, in its most simple embodiment, closed down to a nominal value, while the regulator valve for air supply 112 is fully open. It may be sufficient that both of the regulator valves 113/160 or one of them can be regulated, for various processes.

The invention is not limited to a pressurised disc filter as specified by the embodiments described above. It can also be applied to a pressurised drum filter.

An example that shows the advantages of the invention with a pressurised lime mud filter of drum or disc type over conventional technology using vacuum filters is described below. The same partial pressure of oxygen is established in this example in the pressurised application. An improved oxidation of the sulphide content of the lime mud is then obtained at elevated temperature.

A conventional vacuum drum filter operates at a cake temperature of around 55° C. while a pressurised disc or drum filter preferably operates at a higher temperature in order to improve the filter capacity. The temperature of the pressurized lime mud filter selected in this example is 85° C. for the input, while the temperature of the cake is approximately the same.

A pressurised lime mud filter operates at a pressure of 2.0 bar (a) on the input side of the lime mud and at atmospheric pressure, 1.0 bar (a) on the filtrate side. The lime mud typically contains 0.13 mol sulphide/kg dry lime mud that is fed to the filter. Up to 60% of the sulphide content is oxidised in a typical vacuum drum or vacuum disc filter, principally to thiosulphate.

The outermost layer, i.e. the part that will be scraped off by the scraper, will be exposed to air at essentially atmospheric pressure in the conventional vacuum filter and at a vapour pressure that is essentially the same as the saturation pressure at the cake temperature, approximately 0.16 bar (a) at 55° C. The partial pressure of oxygen gas will then be (1.0-0.16) bar (a)×21% of the volume of oxygen in air, =0.18 bar (a).

The pressurised filter operates at a total pressure of 2 bar (a) at the surface of the cake. The vapour pressure at 85° C. will be 0.58 bar. The total dry gas pressure will then be given by (2.0-0.58)=1.42 bar (a), 0.18 bar of which must be the partial pressure of oxygen gas. The amount of oxygen gas in dry recirculated gas must then be 0.18/1.42*100=12.6 volume percent.

The oxidation of sulphide to thiosulphate will consume 60%×0.13 mol $O_2$/kg dry lime mud, which is the same as 0.08 mol $O_2$/kg dry lime mud. The total requirement for the amount of air that is added in order to maintain the partial pressure at 0.18 bar is then 0.08*21/(21-12.6)=0.20 mol $O_2$/kg dry lime mud, or calculated as air, 0.20/21%=0.93 mol air/kg dry lime mud. Using the molecular volume of an ideal gas, 22.4 l/mol, allows us to obtain the amount of added air as 0.93*22.4/1000=0.02 $m^3$(n)/kg dry lime mud.

The specific capacity of the pressurised filter will be approximately 10 kg dry lime mud/$m^2$, min and the total recirculating gas flow that is necessary will be approximately 2 $m^3$(n), $m^2$, min. The specific recirculating gas flow will thus be 2/10=0.2 $m^3$ (n)/kg dry lime mud. The amount of air added will then be 0.02/0.2=10% of the total flow of recirculated air.

Given the establishment of the same partial pressure of oxygen gas in a pressurised filter as in a vacuum filter (i.e. 0.18 bar (a)), a significantly higher temperature can be established during filtration, typically 85° C. for the pressurised filtration and 55° C. in the vacuum filter, without significant loss of energy, and this give a better oxidation, filtration and the possibility of an increased capacity.

The invention is not limited to the embodiments shown. Several variants are possible within the framework of the claims.

If it is desired to increase the amount of oxygen gas, the amount of air that is exchanged can be increased from, for example, 10% to 10-20%. The elevated temperature, however, gives an improved oxidising ability, which means that the amount of air that is exchanged can be lower than 10% in the example given, while still retaining an improved capacity.

It is possible with the invention to establish a significantly higher temperature on the lime mud side than is possible with vacuum filters, where the latter are connected on the lime mud side to the atmosphere, which has a temperature on industrial premises of 20-30° C. The establishment of a temperature of 85° C. on the lime mud side allows the achievement of a significantly improved is oxidation ability, and if the partial pressure of the oxygen gas is maintained at the same level as that of a vacuum filter, the filtering capacity can be considerably increased.

A further embodiment is to filter at a temperature that is even higher, typically 95-120° C. However, this involves modification of the technology for the addition of air, which may require compressors or ejectors (thermocompressors) in order to add the air. This variant with the pressurised addition of a controlled amount of air can also be used at a temperature of 75-95° C.

While the present invention has been described in accordance with preferred compositions and embodiments, it is to be understood that certain substitutions and alterations may be made thereto without departing from the spirit and scope of the following claims.

The invention claimed is:

1. A method for dewatering and washing a lime mud before dewatered lime mud is transported to a lime mud kiln, comprising:
    dewatering the lime mud in a pressurized filter, connecting the pressurized filter to a closed gas circulation system,
    connecting a filtrate tank to a filtrate side of the pressurized filter and where a fluid level of filtrate is established from the pressurized filter,
    pressurizing the pressurized filter,
    a compressor drawing on a suction side thereof a gas phase from the filtrate tank, and a pressurized side of the compressor pressurizing, via the gas circulation system, a lime mud side of the pressurized filter,
    venting a pre-determined amount of the gas phase directly from the gas circulation system, and
    adding an equivalent pre-determined amount of fresh air directly to the gas circulation system to maintaining a partial pressure of oxygen gas above a pre-determined minimum level.

2. The method according to claim 1, wherein a temperature in the pressurized filter, including a temperature of the recycled gas phase, is maintained above 75° C.

3. The method according to claim 1 wherein an amount of residual white liquor in the lime mud does not exceed 10% of white liquor that is formed in a previous causticization step.

4. The method according to claim 1 wherein the lime mud that has been filtered out from the lime mud is dry-fed out from a disc filter for onward transportation to the lime mud kiln.

5. The method according to claim 1 wherein de-airing of the recycled gas phase is carried out on the pressurized side of the compressor via a de-airing device and an addition of fresh air is carried out by an air-supply device connected to the suction side of the compressor.

6. The method according to claim 1 wherein de-airing of recycled gas phase is carried out on the suction side of the compressor at a first distance from an inlet to the compressor via a de-airing device and an addition of fresh air is carried out through an air-supply device on the suction side of the compressor at a second distance from an inlet to the compressor, where the first distance is greater than the second distance.

7. The method according to claim 1 wherein an amount of recirculated gas phase that is exchanged lies within an interval 5-20%.

8. The method according to claim 1 wherein an amount of recirculated gas phase that is exchanged is regulated such that the amount depends on a detected process parameter.

9. The method according to claim 8, wherein the detected process parameter is the partial pressure of oxygen gas in the pressurized filter.

10. The method according to claim 8, wherein the detected process parameter is a flow rate of lime mud or dewatered lime mud, or parameters that are representative of these flow rates.

11. The method according to claim 1 wherein the pressurized filter is of a disc filter type.

12. A method for washing and dewatering a lime mud before dewatered lime mud is transported to a lime mud kiln, comprising:
    dewatering the lime mud in a pressurized filter,
    arranging a recirculation line for a gas phase from a filtrate side of a mud side,
    connecting the pressurized filter to a gas circulation system that is essentially closed,
    connecting a filtrate tank to a filtrate side of the pressurized filter and where a fluid level of a filtrate is established from the pressurized filter,
    pressurizing the pressurized filter,
    a compressor drawing on a suction side thereof a gas phase from the filtrate tank and a pressurized side of the compressor pressurizing, via the gas circulation system a lime mud side of the pressurized filter,
    venting a certain pre-determined amount of gas phase directly from the gas circulation system, through a de-airing device, and
    adding an equivalent pre-determined amount of fresh air directly to the gas circulation system through an air-supply device to maintain a partial pressure of oxygen gas above a pre-determined minimum level.

13. The method according to claim 12, wherein the de-airing device is arranged at a position on the pressurized side of the compressor, and in that the air-supply device is arranged at a position on the suction side of the compressor.

14. The method according to claim 12, wherein the de-airing device is arranged at a position on the suction side of the compressor at a first distance from the compressor, and the air-supply device is arranged at a position on the suction side of the compressor at a second distance from the compressor, wherein the first distance is greater than the second distance.

15. The method according to claim 12 wherein a control unit controls regulator valves.

16. The method according to claim 15, wherein the control unit receives input signals from sensors.

17. The method according to claim 12 wherein the pressurized filter is of a disc filter type.

* * * * *